US008229847B2

(12) United States Patent
McKernan et al.

(10) Patent No.: US 8,229,847 B2
(45) Date of Patent: Jul. 24, 2012

(54) MONEY TRANSFERS FOR TAX REFUNDS

(75) Inventors: Patricia M. McKernan, Parker, CO (US); Ramona Johnson, Parker, CO (US); Christian J. Trujillo, Denver, CO (US)

(73) Assignee: The Western Union Company, Englewood, CO (US)

( * ) Notice: Subject to any disclaimer, the term of this patent is extended or adjusted under 35 U.S.C. 154(b) by 398 days.

(21) Appl. No.: 12/641,762

(22) Filed: Dec. 18, 2009

(65) Prior Publication Data
US 2010/0161461 A1    Jun. 24, 2010

Related U.S. Application Data

(63) Continuation-in-part of application No. 11/670,972, filed on Feb. 3, 2007, now Pat. No. 7,657,483.

(51) Int. Cl.
*G06Q 40/00* (2006.01)
*G07B 17/00* (2006.01)
*G07F 19/00* (2006.01)
*G06F 17/22* (2006.01)

(52) U.S. Cl. ............................... 705/39; 705/30; 705/31

(58) Field of Classification Search .................. 705/30, 705/31
See application file for complete search history.

(56) References Cited

U.S. PATENT DOCUMENTS

| | | | |
|---|---|---|---|
| 5,963,921 A * | 10/1999 | Longfield | 705/31 |
| 7,072,862 B1 | 7/2006 | Wilson | |
| 7,127,425 B1 * | 10/2006 | Wilson | 705/38 |
| 7,177,829 B1 | 2/2007 | Wilson et al. | |
| 7,257,553 B1 * | 8/2007 | Baker | 705/31 |
| 7,742,958 B1 * | 6/2010 | Leek et al. | 705/31 |
| 8,090,649 B2 * | 1/2012 | Galit et al. | 705/38 |
| 2003/0097331 A1 * | 5/2003 | Cohen | 705/39 |
| 2003/0167225 A1 * | 9/2003 | Adams | 705/38 |
| 2005/0119955 A1 * | 6/2005 | Dang et al. | 705/31 |
| 2007/0233596 A1 * | 10/2007 | Ambrose, Jr. | 705/38 |
| 2008/0040779 A1 * | 2/2008 | Budzichowski | 726/5 |

OTHER PUBLICATIONS

HDFC Bank, Visa launch money transfer service Business Line Mar. 31, 2005.*
Low-income S.C. residents drawn to fast-refund loans Matthew Mogul KRTBN Knight-Ridder Tribune Business News—The Post and Courier, CHA Apr. 12, 2005.*
Banking the Poor Barr, Michael S Yale Journal on Regulation v21n1 pp. 121-237 Winter 2004.*
Allowing Taxpayers to "Split" Their Refunds is "Fraught With Danger" Jul. 11, 2011.*
Community Reinvestment Association of North Carolina Feb. 14, 2011 Shulman.*
The Retirement Security Project Leveraging Tax Refunds to Encourage Saving Aug. 2005 Tufano, Schneider, Beverly.*

(Continued)

*Primary Examiner* — William Rankins
(74) *Attorney, Agent, or Firm* — Kilpatrick Townsend & Stockton LLP

(57) ABSTRACT

Tax refunds are provided via a money transfer service. Merely by way of example, a taxpayer (or a tax preparer) might provide to the IRS an account number at a bank, as a target for a direct deposit refund related to a tax return. In an aspect, the account number might have a specific format that informs the bank that the refund is to be processed by the money transfer service, and in another aspect, the account number might include data that identifies the taxpayer to the money transfer service.

23 Claims, 4 Drawing Sheets

OTHER PUBLICATIONS

Splitting Refunds: A Proposal to Leverage the Tax Filing Process to Promote Savings and Asset Building by Reid Cramer No date.*
IRS will not Expand the Split Refund Jun. 30, 2011 Bank Talk.*
Bair, Sheila C., University of Massachusetts Amherst Profile http://www.isenberg.umass.edu/finopmgt/faculty/profiles/Sheila_Bair, 2 pages, printed Apr. 10, 2008.
Bair, Sheila C., "Improving Access to the U.S. Banking System Among Recent Latin American Immigrants", University of Massachusetts—Amherst, 40 pages, Feb. 2003.
Barr, Michael S., "Banking the Poor", Yale Journal on Regulation v21n1 pp. 121-237, Winter 2004.
HDFC Bank, "Visa launch money transfer service", Business Line, Mar. 31, 2005.
Mogul, Matthew, "Low income S.C. residents drawn to fast-refund loans", KRTBN Knight—Ridder Tribune Business News—The Post and Courier, Cha, Apr. 12, 2005.
Russell, Roger, "Products that e-preparers can take to the bank", Accounting Today, Jun. 4, 2001.

* cited by examiner

MONEY TRANSFERS FOR TAX REFUNDS

CROSS-REFERENCES TO RELATED APPLICATIONS

This application is a continuation-in-part of U.S. patent application Ser. No. 11/670,972 filed Feb. 3, 2007, entitled "Money Transfers for Tax Refunds." Such disclosure is hereby incorporated by reference in its entirety for all purposes.

FIELD OF THE INVENTION

The present invention relates to financial transactions in general and, more particularly, to financial transactions for providing tax refunds to taxpayers.

BACKGROUND OF THE INVENTION

In recent years, the Internal Revenue Service ("IRS"), as well as many state tax authorities, have offered to provide tax refunds by direct deposit service. This service has several advantages for taxpayers. Chief among those advantages is the speed with which the refund is received. Additionally, direct deposit provides enhanced convenience for the taxpayer, since the taxpayer does not need to undertake the cumbersome process of receiving a paper check, taking the paper check to a bank or other financial institution, and cashing or depositing the check.

Moreover, for an unbanked taxpayer (i.e., a taxpayer who has no deposit account with any financial institution), direct deposit traditionally has not been an option. In an attempt to remedy this disparity, some tax preparers and financial institutions offer alternative products, such as refund advances. Typically, however, these products are accompanied by exorbitant fees and burdensome procedures. Moreover, many taxpayers would prefer to have a tax preparer's fee deducted from the refund proceeds, rather than paying this fee in advance. IRS regulations, however, prohibit direct deposits of a refund to any account not titled in the name of the taxpayer. Hence, even if the taxpayer had a bank account into which a refund could be deposited directly, there was no ability to segregate a portion of the funds into another account to satisfy preparer fees. To avoid this limitation, a taxpayer was forced to undertake even more burdensome procedures, such as giving the tax preparer power of attorney in order to allow the preparer's fee to be deducted from the refund proceeds.

Recently, the IRS has introduced a more flexible system, in which a taxpayer can designate multiple accounts (on IRS Form 8888) into which a tax refund should be deposited, and the amount that should be deposited into each account. It is anticipated that many state tax authorities will follow this practice as well. Conveniently, this would seem to provide an opportunity to allow a taxpayer to have the bulk of the refund paid into his or her personal account, with some fee paid (out of the refund amount) separately to the tax preparer's account. However, IRS regulations specify (and Form 8888 specifically states) that each of the accounts must be in the taxpayer's name. Hence, in order to take advantage of the new Form 8888 to pay a preparer's fee, a taxpayer would have to establish a separate account, in the taxpayer's name, for the preparer, and then provide the preparer with some form of power of attorney to access the account. This is no more desirable than prior arrangements. In addition, if a taxpayer wants to use the Form 8888 to have a portion of their refund purchase savings bonds or fund an IDA (individual development account), they may need to have the remaining portion of their refund disbursed via direct deposit. For a taxpayer with no bank account, this may be a problem.

Hence, there is a need for a facility to allow a taxpayer (and especially an unbanked taxpayer) to receive a tax refund in expeditious fashion, with an easy way of reconciling funds received through the facility from the IRS with payments expected to be received by taxpayers. Further, it would be helpful if such a facility also allowed for tax preparer fees (and/or any other necessary fees) to be deducted in a convenient manner from the refund proceeds, to allow the taxpayer to avoid the dilemma of either having to pay for tax preparation service before receiving the refund or undertaking the burden and expense of obtaining a refund advance.

BRIEF SUMMARY OF THE INVENTION

Embodiments of the invention provide novel facilities (including, without limitation, systems, methods and software) for providing tax refunds without requiring the taxpayer to maintain a deposit account with a financial institution. In an aspect of some embodiments, the invention allows for one or more fees (such as tax preparer fees and the like) to be deducted from the amount of the refund as well.

Certain embodiments employ a money transfer service to allow the taxpayer to receive the refund (perhaps after subtracting any appropriate fees) at a convenient location, in expeditious fashion. In a set of embodiments, for example, a taxpayer (or a tax preparer) might provide to the IRS (or any other suitable tax authority) an account number at a bank (or other financial institution), as a target for a direct deposit refund related to a tax return. In an aspect, the account number might have a specific format that informs the bank that the refund is to be processed by the money transfer service, and in another aspect, the account number might include data that identifies the taxpayer to the money transfer service.

In accordance with a set of embodiments, upon receiving (e.g., from the IRS) a direct deposit of the tax refund, the bank recognizes the refund as being related to the money transfer service and initiates a transfer transaction (such as a host-to-host transaction) to transfer the refund amount, or at least a portion thereof, to the money transfer service. In an aspect, this transfer transaction might include information (such as the taxpayer name, and/or some other identifying information, such as some or all of the taxpayer's taxpayer identification number ("TIN"), phone number, zip code, birthdate or the like, which can allow the money transfer service to verify the recipient's identity).

In some embodiments, the money transfer service identifies the transfer transaction as a money transfer transaction, with the taxpayer as recipient. The taxpayer can then request the funds, using any of a variety of methods (e.g., in person at an agent location of the money transfer service, by computer or telephone transfer to another account or recipient, as a stored value card, mobile wallet, etc.) In an aspect, the money transfer service can validate the identity of the recipient using one or more of several procedures, including without limitation a challenge question. Optionally, the money transfer service can verify a payout area for the funds, based perhaps on a location identifier (such as a zip code, etc.) that can be a part of the account number and/or can be included with the transfer transaction. Assuming verification of the recipient's identification and/or that the recipient is located in the payout area, the money transfer service can provide the funds to the recipient.

Optionally, the tax preparer can provide an additional account number with the tax return. In an aspect, this additional account number might have a specific format that informs the bank that the refund is to be processed by the money transfer service (and/or that it relates to a tax preparer fee), and in another aspect, the account number might include data that allows the bank to identify an account (perhaps at another bank) into which funds associated with this additional account should be transferred. In this way, the tax preparer's fees can be deducted from the refund and provided separately to the tax preparer. (Although it is assumed, in most cases, that the tax preparer will have a deposit account or prepaid account/card into which the fee should be deposited, if desired, a procedure utilizing a money transfer service—similar to that used for the taxpayer's refund—can be implemented to provide the fee to the tax preparer.)

Various embodiments of the invention provide, inter alia, methods, systems and software products. In some embodiments of the invention, a system (such as a computer system) might be configured to implement a method of the invention. Merely by way of example, the system might comprise, inter alia, one or more processors, along with instructions (which might be stored on a disk and/or other computer readable medium) executable by the processors to perform the method. In other embodiments, a software product might embody the method, for example as a set of instructions (which again, might be stored on a disk and/or other computer readable medium), which are executable by one or more computers to execute the method. In yet other embodiments, one or more physical and/or tangible signals might be embedded in a carrier wave. The signals might comprise instructions executable by a computer to perform methods of the invention.

Hence, in accordance with one set of embodiments, a method of providing a tax refund might be implemented in a relationship between a tax preparer, a financial institution, a money transfer service, and a taxpayer, a method of providing a tax refund to the taxpayer in relation to a tax return. The method might comprise creating one or more account identifiers. In a particular embodiment, an account identifier (which may or may not correspond to an actual account at a financial institution) might comprise a number of components.

Merely by way of example, an account identifier might comprise a money transfer service identifier, which can serve, in some embodiments to identify an account (which might be a real account and/or a pseudo-account) at the financial institution as corresponding to the money transfer service. An account identifier might further comprise a tax return type identifier, which designates whether a particular tax return (with which the account number is associated) is a federal return or a state return, and/or a preparer identifier, which might identify a tax preparer who prepared the return. In some cases, the account identifier might also comprise a location identifier (e.g., a zip code identifier), a birthdate identifier, and/or a taxpayer identifier, which might comprise sufficient information (such as a portion of a TIN number, etc., to name but one example) to identify a taxpayer and/or verify the identity of a taxpayer.

The method might further comprise providing one or more such account identifiers as direct deposit targets for a refund associated with the return. (In some cases, a routing number for the financial institution might be provided as well.) Merely by way of example, a first account identifier might be a direct deposit target for a first portion of a refund, and a second account identifier might be a direct deposit target for a second portion of the refund.

Accordingly, in some embodiments, the method might comprises receiving (e.g., at a host computer operated by the financial institution) one or more direct deposit transactions. These transactions might have associated therewith (e.g., in a field of an ACH deposit request representing the transaction) a name of the taxpayer, and/or they might be directed to the account identifiers provided with the tax return.

In some cases, one of the direct deposit transactions might be identified as corresponding to a payment to a tax preparer. In such cases, a set of preparer direct deposit information might be identified (perhaps based on a correlation between preparer identity and preparer direct deposit information established in an earlier enrollment transaction), and a funds transfer can be performed to transfer some or all of the funds from that direct deposit transaction to the preparer's account.

Another of the direct deposit transactions might be identified as relating to a money transfer service (perhaps based on a money transfer service identifier in the account identifier to which the transaction is targeted). Accordingly, in some embodiments, a host-to-host money transfer transaction might be performed (e.g., between the financial institution's host computer and a second host computer operated by the money service provider). In an aspect, the host-to-host transaction might transfers an amount of money corresponding to at least a portion of the direct deposit transaction, and/or the host-to-host transaction might have associated therewith a set of data, such as a location identifier, birth date, taxpayer name, taxpayer identifier, etc. In an aspect, the taxpayer name can be derived from the direct deposit transactions and/or used as the recipient for the host-to-host money transfer transaction.

At the money transfer service's host computer, the transaction might be received and/or identified as a money transfer transaction having the taxpayer as a recipient. In some cases, a payout area for the transaction might be determined, based, for example, on the location identifier (e.g., the zip code) of the taxpayer. Upon receiving a request from the taxpayer to receive the funds from the transaction, an amount of money corresponding to at least a portion of the amount of the host-to-host transaction might be provided to the taxpayer. Optionally, the identity of the taxpayer might be verified (for example, by reference to the taxpayer identifier associated with the host-to-host transaction, and/or it may be verified that the taxpayer is within the determined payout area.

Another exemplary method might comprise receiving (e.g., at a first host computer operated by a financial institution) a direct deposit transaction in a first amount from a governmental entity. In an aspect, the direct deposit transaction might correspond to a refund related to a tax return filed on behalf of a taxpayer. In another aspect, the direct deposit transaction might have associated therewith an account identifier, which, in a particular embodiment, comprises a first portion having sufficient information to identify the direct deposit as being related to the money transfer service and a second portion having sufficient information to enable the money transfer service to identify the taxpayer.

In some embodiments, the method further comprises identifying the direct deposit transaction as being related to a money transfer service, at the first host computer, perhaps based at least in part on the first portion of the account identifier. Accordingly, the method might further comprise performing a money transfer transaction (which might be, merely by way of example, a host-to-host transaction from the first host computer to a second host computer operated by the money transfer service). In an aspect, the money transfer transaction has a second amount and has a recipient identifier associated with the money transfer transaction. In some embodiments, the recipient identifier is derived, at least in part, from the second portion of the account identifier and/or might comprise sufficient information to enable the money transfer service to identify the taxpayer as a recipient of the money transfer. In another aspect, the money transfer transaction might result in the transfer of funds from an account at the first host computer to an account at the second host computer.

Yet another exemplary method comprises receiving (e.g., at a first host computer operated by the money transfer service), a money transfer transaction (which might be, merely by way of example, a host-to-host transaction) from a second host computer operated by the financial institution. In an aspect, a host-to-host transaction might have a first amount and/or a recipient identifier associated with the host-to-host transaction. The recipient identifier might be derived, at least in part, from an account number provided as a direct deposit target for the tax refund. Additionally and/or alternatively, the recipient identifier might comprise sufficient information to identify the taxpayer and/or to verify the identity of the taxpayer.

In an embodiment, the exemplary method comprises identifying, at the first host computer, the host-to-host transaction as a money transfer transaction having the taxpayer as a recipient, perhaps based at least in part on the recipient identifier. Upon receiving a request from the taxpayer to obtain funds from the money transfer transaction, the method might comprise providing, to the taxpayer, an amount of money corresponding to at least a portion of the first amount.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

While various aspects of the invention have been summarized above, certain exemplary embodiments of the invention are described in further detail below. It should be noted that the embodiments discussed herein are intended only to be exemplary and are provided for illustrative purposes, and that they are not intended, nor should they be interpreted, to be exhaustive or limiting descriptions of the invention. While various embodiments are described herein, one skilled in the art should appreciate that various components, processes and/or features described with respect to one embodiment easily can be incorporated within other embodiments. Similarly, which various alternatives and/or optional components, processes and/or features may be described, it should be understood that the invention can, in various embodiments, omit and/or substitute such components, processes and/or features as appropriate.

In an aspect, certain embodiments of the invention include systems for providing a tax refund to a taxpayer using a money transfer service. Such embodiments can, inter alia, allow the taxpayer to receive the refund (perhaps after subtracting any appropriate fees) at a convenient location, in expeditious fashion. Hence, in accordance with an aspect of some embodiments, a taxpayer can enjoy various benefits of a direct deposit refund, as well as other benefits (delayed payment of tax preparer fees, etc.) without having to maintain a deposit account with a bank or other financial institution.

In an aspect of the invention, a relationship exists between a taxpayer, an (optional) tax preparer, a financial institution, and a money transfer service. As used herein, the term "financial institution" means any bank or other facility that provides one or more traditional banking services, including, without limitation, deposit accounts, check writing privileges, participation in the automated clearinghouse ("ACH") system, and/or the like. The terms "financial institution" and "bank" are used interchangeably herein, and each term should be given the broadest possible interpretation consistent with the functions ascribed to such terms. As used herein, the term "money transfer service" means any entity and/or facility that can provide to a taxpayer funds from a tax refund in accordance with embodiments of the invention described herein. Such entities and/or facilities can include without limitation, personal and/or commercial money transfer providers, bill payment service providers, and/or the like. In some embodiments, other types of financial service providers, including without limitation, financial institutions, tax preparers and/or the like might provide the services of a money transfer service, as described herein.

Figure 1:
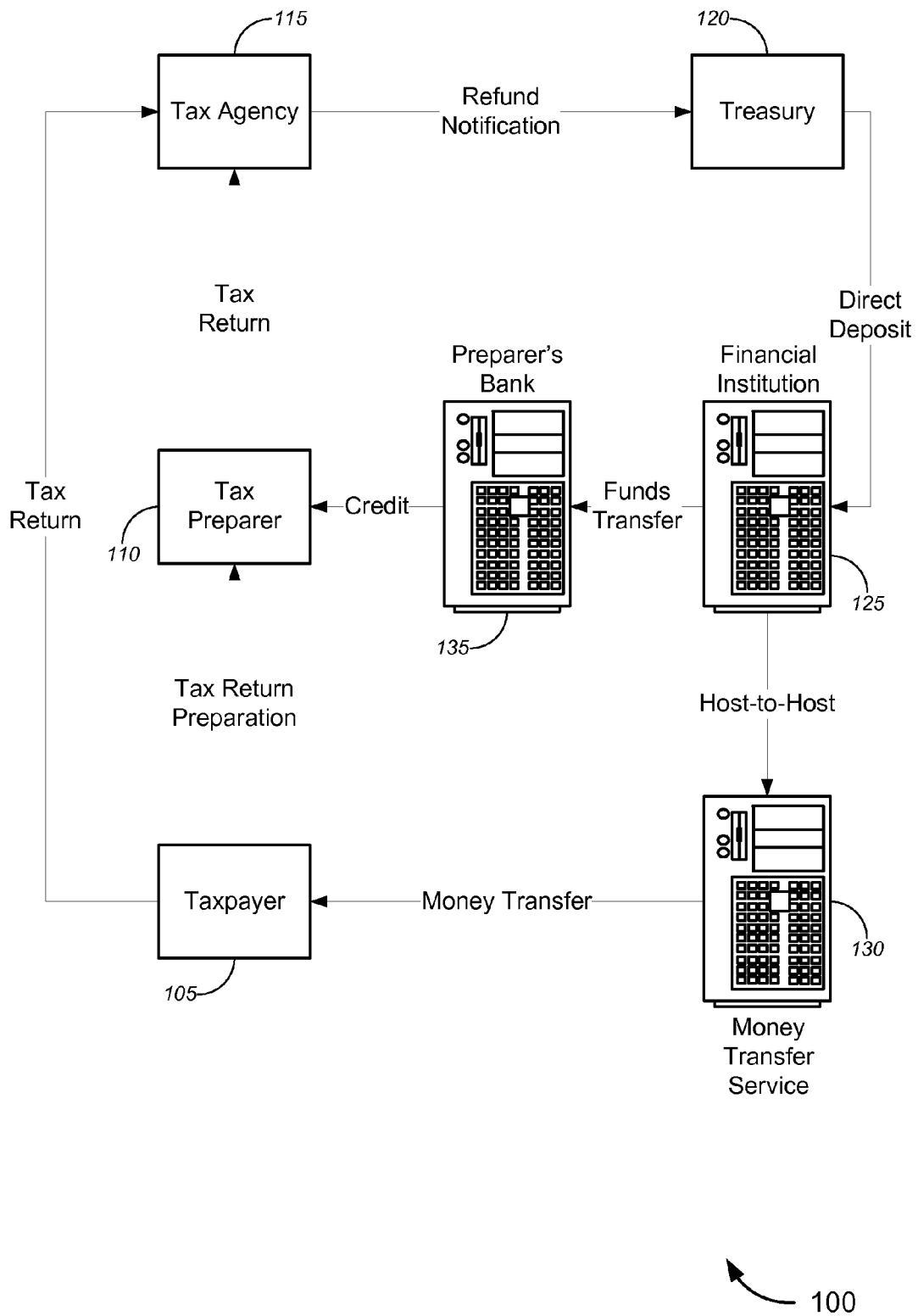
FIG. 1 is a block diagram illustrating relationships between various parties to provide a tax refund, in accordance with various embodiments of the invention.

FIG. 1, then, illustrates an exemplary relationship 100 between a taxpayer 105, tax preparer 110, financial institution 125 and money service provider 130. In an embodiment, the taxpayer approaches a tax preparer 110 to prepare a tax return for the taxpayer. (Alternatively, the taxpayer can prepare the return on his or her own). As used herein, the term "tax preparer" (or simply "preparer") is used to refer to any entity that prepares tax return for the benefit (and/or at the direction) of another, usually in return for a tax preparation fee and/or as part of a charitable enterprise (e.g., Volunteer Income Tax Assistance ("VITA"), Tax Counseling for the Elderly ("TCE"), etc.). Exemplary preparers include certified public accountants, financial advisors, attorneys, enrolled agents, tax preparation volunteers and the like.

In preparing the return, the preparer and/or taxpayer can specify an account to receive, as a direct deposit, any refund due on the return. Merely by way of example, IRS Form 1040 provides fields for a routing number and account number to receive a direct deposit of any refund associated with the return. Further, as noted above, Form 8888 allows the taxpayer to specify up to three amounts to be deposited in different accounts, and to provide three different routing number/account number pairs as direct deposit targets for these three amounts.

Once the return has been prepared, it is filed (or otherwise submitted to a tax agency 115) on behalf of the taxpayer. When referring to preparing and/or filing a tax return, this document uses the phrase "on behalf of" in a broad sense to refer to any preparation, filing, etc. of a tax return by a taxpayer, at the direction of a taxpayer, for the benefit of a taxpayer, with the authorization of a taxpayer, and/or the like. As used herein, the term "tax agency" refers to any governmental entity and/or authority that is charged with collecting tax revenues and/or with which tax returns must be filed. In the United States, the paramount tax agency is the IRS. Other tax agencies include, without limitation state taxation authorities, departments of revenue, franchise boards, and the like, as well as local (e.g., municipal, county, etc.) taxation authorities. If the return indicates that a tax refund is owing (and the tax agency 115 agrees with the figures on the tax return), the tax agency informs a treasury 120 that a refund should be processed in relation to the tax return. Specifically, if the tax return provided one or more accounts as direct deposit targets for the refund (e.g., on Form 1040, Form 8888, etc.) the tax agency 115 provides this data to the treasury 120 so that a direct deposit transaction can be processed. Like the term "tax agency," the term "treasury" is used broadly herein to indicate any governmental entity (and/or any associated bank, financial institution, fund and/or account) that serves, inter alia, to provide funds for tax refunds. Such entities can include the United States Treasury, as well as various other state and/or local treasurers, and the like. In some cases, the tax agency 115 and treasury 120 may be consolidated within a single governmental entity.

The treasury 120, then, initiates a direct deposit transaction with a financial institution 125, using the direct deposit target(s) (i.e., routing and account numbers) provided with the return. In the case in which the taxpayer 105 has provided two (or more) direct deposit targets, the treasury 120, accordingly, might initiate two (or more) direct deposit transactions.

In an aspect, particular embodiments involve the creation, as direct deposit targets, of account numbers that indicate to the receiving financial institution 125 that the account, instead of being a normal deposit account, is to be used in accordance with the present invention. In another aspect, there might be two different account numbers used. The first type of account number is used for the bulk of the refund amount, while the second type of account is used for the fees due to the tax preparer (if one was used). In specific embodiments, the account numbers will have a predetermined format. Accordingly, if desired, the financial institution will not even have to have pre-established accounts associated with those numbers before receiving the direct deposit transactions. Generally, to comply with IRS regulations, both the direct deposit for the tax preparer's fee and the deposit for the remainder of the refund will be made in the name of the taxpayer, and the accounts nominally will be in the name of the taxpayer. However, since, in an aspect of various embodiments, these accounts are transient in nature (i.e., created ad hoc for the purpose of processing the refund and automatically deleted shortly thereafter) and/or may simply be pseudoaccounts, the name of the account holder is immaterial to the scope of the invention (although, as noted above, the relevant governmental authorities may impose account naming requirements).

Once the direct deposit transaction(s) have been received by the financial institution 125, the financial institution 125 will recognize the deposit(s) as being related to a tax return in accordance with embodiments of the present invention. Accordingly, rather than maintaining the deposited funds in accounts specified by the direct deposit targets(s), the financial institution 125 will initiate a funds transfer to a money transfer service 130, for the bulk of the refund, and, if applicable, will initiate another funds transfer to a bank account for the preparer, at a bank 135 of the preparer's choosing. (The details of these transfers, in accordance with are discussed below.) The taxpayer 105, then can obtain the funds from the refund (minus any applicable fees, such as the preparer's fee and/or any other fees associated with the refund service) in the same manner as any money transfer can be obtained. The preparer's 110 fee is held in his account at his bank 135, and he can access those funds in any conventional manner.

Figure 2:
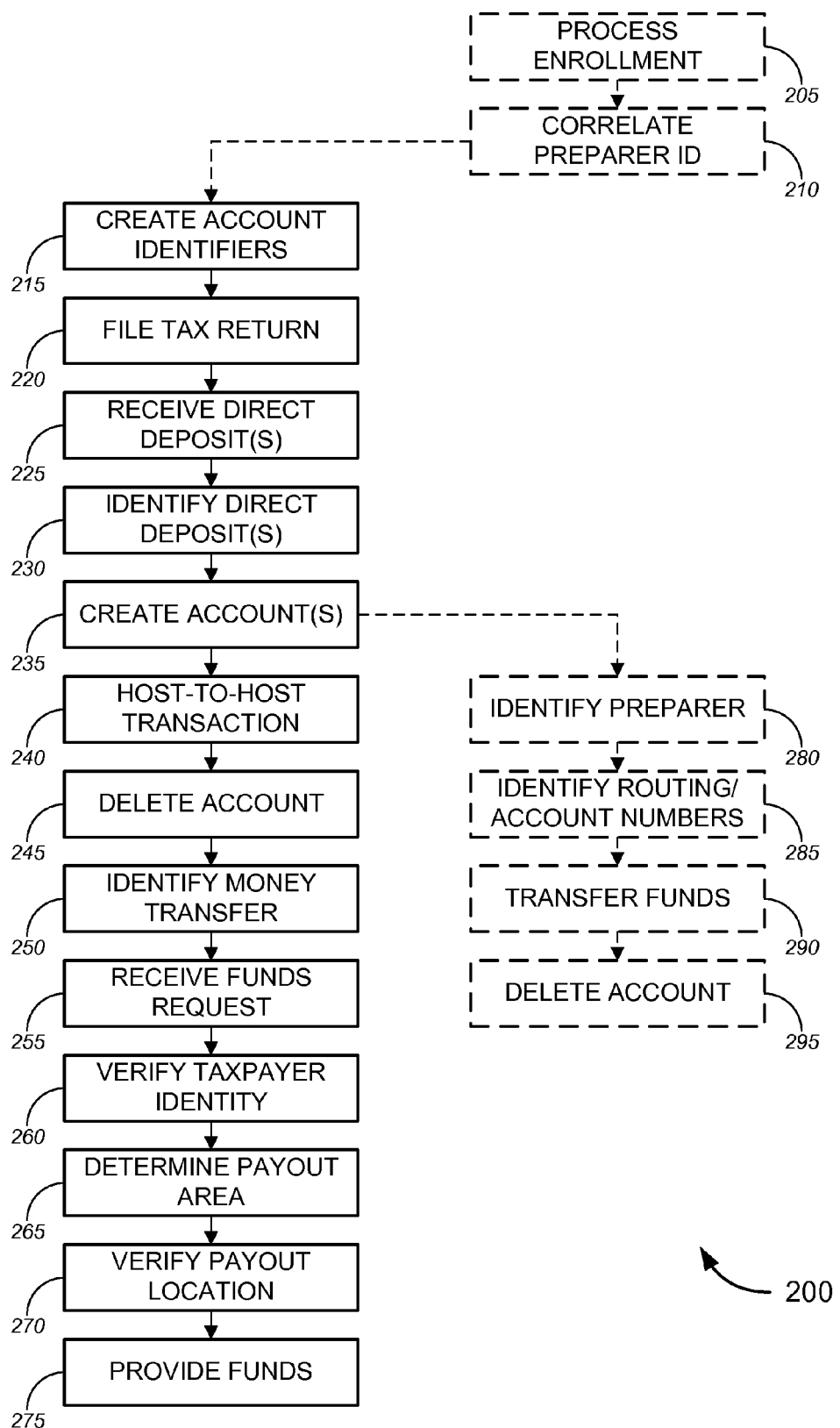
FIG. 2 is flow diagram illustrating a method of providing a tax refund, in accordance with various embodiments of the invention.

A detailed illustration of this refund process will be described by reference to FIG. 2, which illustrates a method 200 of providing a tax refund, in accordance with one set of embodiments. The method 200 will be described herein in conjunction with FIG. 1, although it should be appreciated that the method 200 (and similar methods) could be implemented using different components than those illustrated by FIG. 1, and that the components of FIG. 1 could operate in accordance with methods other than the method 200 of FIG. 2. It should be noted that the method of FIG. 2 is generalized to both the situation in which a tax preparer's fees are to be paid out of the refund and the situation in which there is no tax preparer (or in which the tax preparer's fees are to be paid in some other fashion). Hence, the procedures specific to the first situation are indicated with broken lines, while the procedures that are general to both situations are indicated with unbroken lines.

In accordance with the method 200, an enrollment transaction is processed (block 205) for the tax preparer 110. In some cases, this enrollment transaction is processed at a host computer maintained by the financial institution 125 and/or the money transfer service 130. In one embodiment, the enrollment transaction might comprise a computer transaction involving communication between a tax preparer's computer and a host computer. In another embodiment, the enrollment transaction might be based on a paper form completed by the tax preparer and/or another. In yet another embodiment, the enrollment transaction might be a telephone transaction (using a voice response unit, etc.).

Figure 3:
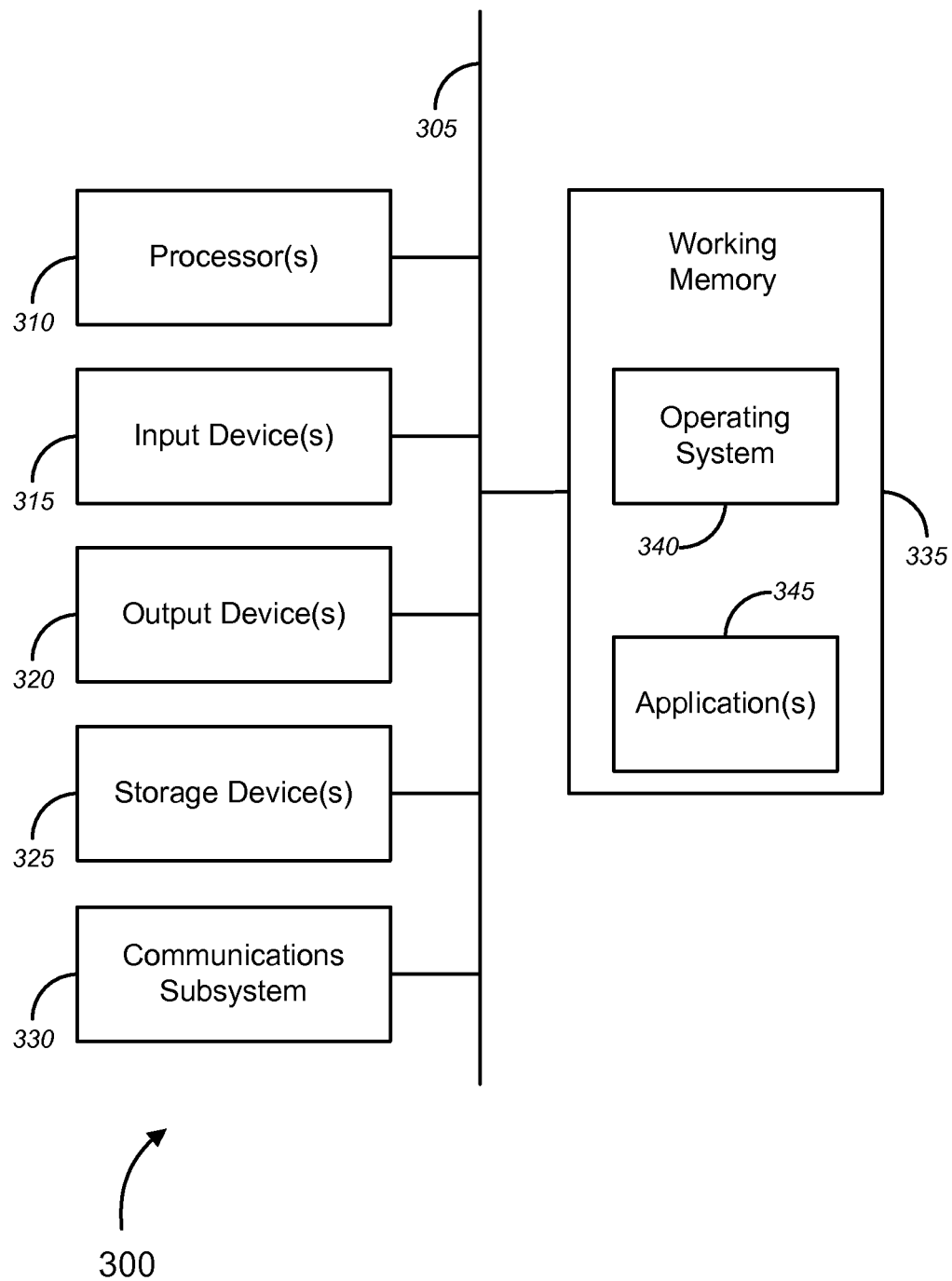
FIG. 3 is a generalized schematic diagram of a computer system that can be used in accordance with various embodiments of the invention.
Figure 4:
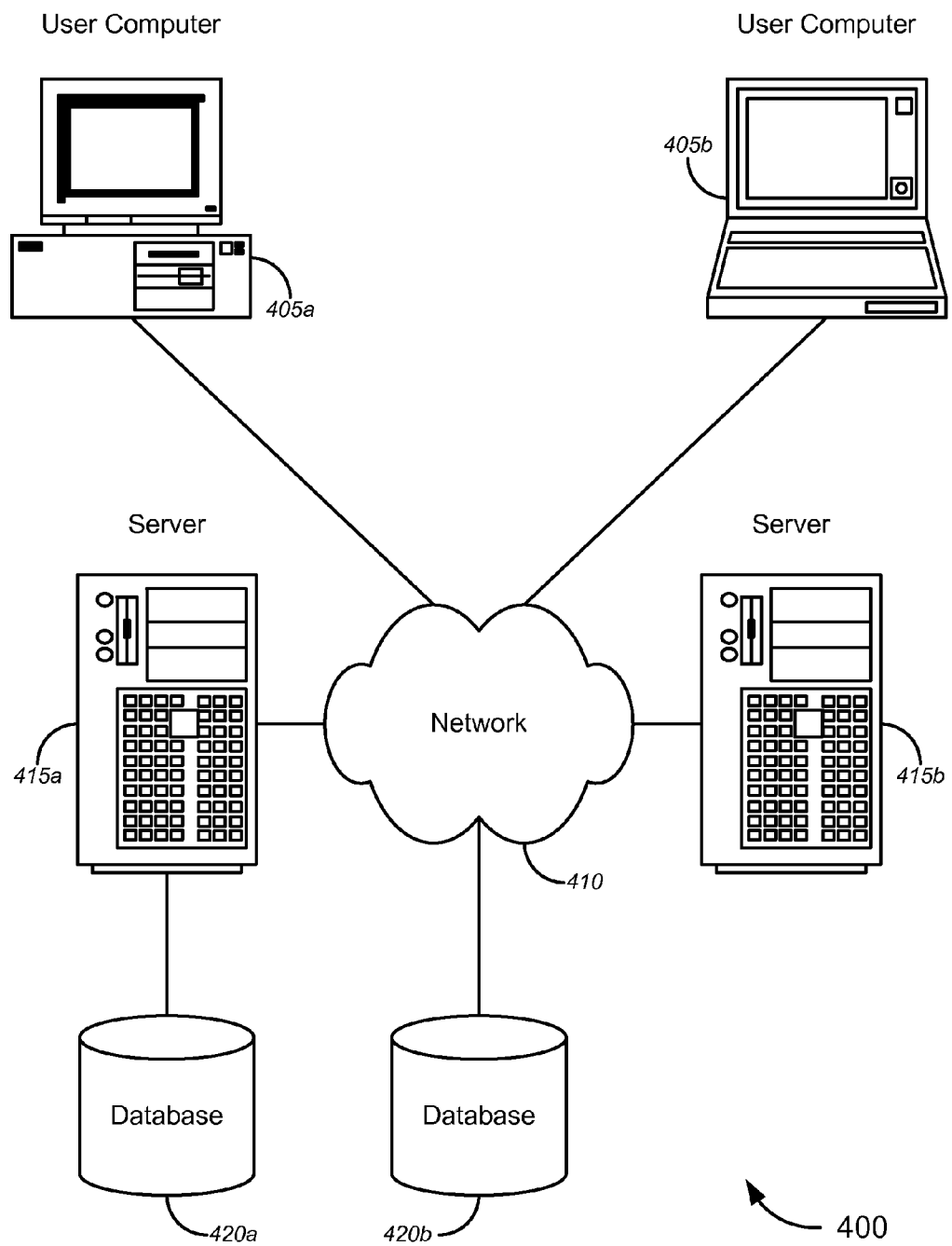
FIG. 4 is a generalized schematic diagram of a networked system of computers that can be used in accordance with various embodiments of the invention.

As used herein, the term "host computer" means any computer (or system of computers) that can be used to process transactions in accordance with embodiments of the invention. One skilled in the art will appreciate, based on the disclosure here, that a variety of configurations are possible. Merely by way of example, in some embodiments, a host computer might comprise one or more mainframe computers, minicomputers, server computers, and/or the like. FIGS. 3 and 4, described below, illustrate various exemplary arrangements that can be used for host computers (and other computers), in accordance with embodiments of the invention.

In an aspect, the tax preparer 110 provides a preparer identifier (or one is provided for the preparer) for the enrollment transaction. Any suitable set of characters can be used as the preparer identifier (such as a telephone number or TIN of the preparer, some portion of either of these, and/or any other suitable identifier). All that matters, for purposes of the invention, is that the preparer identifier identifies the preparer 110 from among other preparers. In addition, the preparer 110 provides routing and/or account numbers for an account at the bank 135 in which the preparer's fees should be deposited, as well, in some cases, as other identifying information, such as the preparer's name, address, and/or the like. (It should be noted that the bank 135 might be the financial institution 125 in certain implementations). These data are provided as input to the financial institution's 125 host computer as part of the enrollment transaction.

Once the enrollment transaction has been completed (and/or, as part of the enrollment transaction), the preparer identifier is correlated with the account and/or routing numbers provided by the preparer (block 210). Merely by way of example, in some embodiments, a database table maintained by a host computer might comprise a record for each enrolled tax preparer, and the table might have, as a key field, the preparer identifier, as well as other fields for routing number, account number, preparer name, preparer address and/or the like.

When a tax return has been prepared (and/or during the preparation of the return), one or more account identifiers are created (block 215). In some embodiments, two account identifiers are created: one for the preparer's fee and another for the balance of the refund. In other embodiments (e.g., if the preparer's fee is not to be deducted from the refund proceeds), there might be only one account number, for the balance of the refund.

In yet other embodiments, there may be additional account identifiers created for various other purposes (depending, in some cases, on the number of accounts allowed by the tax agency and/or the relevant form.). Merely by way of example, in a set of embodiments, a third account identifier might be created to allow a portion of a refund to be used with a bill payment service and/or to transfer funds to a third party. Such embodiments might employ an account identifier similar to those described in detail below, which would be configured to inform the bank that the account identifier is associated with a bill payment and/or third party transfer service. In a particular embodiment, the money transfer service 130 could provide such services. In an aspect, the money transfer service 130 might provide an interface (e.g., a web site, a telephone interface, a software program, etc.) to allow the taxpayer 105 to provide instructions on how to deal with the money (e.g., to which third party or parties the money should be sent, etc.). In a particular aspect of some embodiments, a third account identifier might be used to place a portion of a refund in an account that is used to pay fees associated with the money transfer tax refund service of the invention. (In other embodiments, rather than using an account number, the taxpayer 105 (and/or tax preparer 110) might simply provide an indication (e.g., with a checkbox, etc. on a tax return) that the financial institution 125 and/or the money transfer service 130 is authorized to deduct appropriate fees (for various services) from the refund amount, and that amount might be deducted from the refund and placed in a separate account.

These account identifiers are provided as direct deposit targets for any refund associated with the tax return and will be used (as described below) to facilitate the processing of the refund in accordance with embodiments of the invention. It should be noted, at this point, that the creation of the account numbers does not necessarily imply or require the simultaneous creation of corresponding accounts (although this is possible as well). Instead, in an aspect of certain embodiments (as noted in further detail below), the financial institution 125 need not be aware of the account number(s) until receiving direct deposits targeted to those numbers.

As noted above, in an aspect of some embodiments, the account identifiers comprise data and/or formatting to indicate to the financial institution 125 that the account numbers are to be used in accordance with the present invention. A variety of formats are possible. Merely by way of example, in some embodiments, an account number might be a sixteen digit number of the format "MMMTPPPLLLLLNNNN," where "MMM" is a string of characters (referred to herein as a money transfer service identifier) that identify the account as corresponding to the money service 130, T is a type identifier that identifies the account as relating to a federal (or state) tax refund, PPP is a string of characters that identify the tax preparer 110 (this string might be the preparer identifier mentioned above, and/or, if no preparer is used, the string might be all zeros, etc.), "LLLLL" is a location identifier (which might be a ZIP code or another other appropriate index of location, such as a state or territory identifier, designated marketing area identifier, and/or the like), and "NNNN" is a taxpayer identifier. In some cases the taxpayer identifier might be derived from and/or might be some portion of (e.g., the last four digits, etc.) the taxpayer's 105 TIN (e.g., for an individual taxpayer, the taxpayer's social security number, or for a corporate taxpayer, the taxpayer's federal employer identification number). In other cases (such as when the taxpayer does not have a TIN prior to filing the return), different taxpayer identifiers can be used, such as some derivation and/or portion of the taxpayer's 105 phone number and/or the like. An account identifier having this format might be used for the account into which the taxpayer's 105 portion of the refund.

In some embodiments, a variation of the account number described above is used. For example, a birthdate identifier may be used in place of a location identifier. In such an example, the format of the number may be "MMMTPPPBBBBBBNNNN." Here, the "MMM" identifier, "T" identifier, "PPP" identifier, and "NNNN" identifier may be as previously described. A "BBBBBB" birthdate identifier may be used in place of the "LLLLL" location identifier as described in the previous paragraph. The birthdate identifier may be the same length, longer, or shorter than the location identifier. The birthdate identifier may be subdivided into a "MMDDYY" format where "MM" represents the month in two digits, "DD" represents the day in two digits, and "YY" represents the last two digits of the birthdate year. Those with skill in the art will recognize that various other formats and/or combinations are possible for the birthdate. In some embodiments, if a six digit birthdate identifier is used, the "T" identifier may not be used, thereby allowing the account number to remain at 16 digits.

While in the format of the number involving the birthdate a location identifier is not present, location information may still be gathered at a later time when the taxpayer informs a customer service representative where the payout is to be received. In such a way, both location and birthdate information may be gathered, while only birthdate information being stored in the account number as described above.

In some embodiments, if the taxpayer's fee is to be deducted from the refund, a second account identifier for that refund might be created as well. In an exemplary embodiment, the format for the second account identifier might be the same as for the first account number, except that the MMM string might be different. Thus, for a return in which the preparer is to receive a portion of the refund, the first account number might be, merely by way of example, 91101230427819876, and the second account number might be 91201230427819876. In this example, the string 911 would indicate that the account relates to the taxpayer portion of a money transfer refund service of the present invention, while the string 912 would indicate that the account relates to a tax preparer portion of the refund. The 0 indicates that this account is for a refund on a federal tax return, 123 is preparer identifier, 042781 is the birthdate of the taxpayer (representing Apr. 27, 1981), and 9876 is the last four digits of the taxpayer's TIN. (In other embodiments, however, the account identifiers for the first and second accounts might not be related in this way. As noted above, any format that conveys the necessary information to the financial institution 125 can be used for each of the account identifiers.)

Various ways of creating the account numbers are possible. Merely by way of example, if tax preparation software is used (either by the taxpayer 105 him or herself, or by the tax preparer 110), the software can automatically create the account numbers, perhaps based (at least in part) on biographical information provided by the taxpayer/preparer to the software. In other embodiments, the tax preparer 110 might derive the account number(s) him or herself. However the account number(s) are created, they are added to the tax return (e.g., on Form 1040, Form 8888, etc.) along with the routing number for the financial institution 125, and, if necessary, the amount of the refund corresponding to each account number is provided on the tax return. The tax return is then filed (block 220), either by the tax preparer 110 or the taxpayer 105, as appropriate, using any appropriate procedure (e.g., by mail, electronically, etc.), thus providing the routing numbers and account identifiers to the tax agency 115 as direct deposit targets for various portions of any refund corresponding to the return.

The tax return is then processed by the tax agency 115, and if a refund is owing, the treasury 120 processes one or more direct deposit transactions having, as direct deposit targets, the provided routing and account identifiers. Hence, one or more direct deposit transactions, directed to the provided account identifier(s), will be received by the financial institution 125 (block 225). The transactions generally will be in the name of the taxpayer, since that is an IRS requirement. Merely by way of example, in some embodiments, a direct deposit transaction received from the treasury 120 might be an ACH deposit request, with the name of the taxpayer 105 as the recipient name for the deposit request. In a particular embodiment, then the direct deposit transaction (or more particularly, a recipient (or equivalent) field associated with the transaction can be parsed to ascertain the taxpayer's full name, first and last name, and/or the like). From this information, the taxpayer's name can be derived, and/or this taxpayer name can be used as the recipient name on a money transfer transaction (as described below, for example).

In addition, when the direct deposit transactions are received, the financial institution's host computer will examine the account identifiers to which the transactions are received. Based on the format and/or data of each of the account identifiers (specifically, in some embodiments, the presence of a money transfer service identifier in a specified location within the account identifier), the financial institution's host computer will identify the direct deposit transactions as being related to the money transfer refund service (block 230). Specifically, assuming two direct deposit transactions are received (a first transaction for the taxpayer's portion of the refund and a second transaction for the preparer's fee), the financial institution's host computer will identify the first transaction as relating to the money transfer service and the second transaction as corresponding to a payment to the tax preparer. Thus, instead of processing the direct deposits in a traditional fashion (i.e., crediting the funds from the deposits to preexisting accounts), the financial institution's host computer will process the direct deposit transactions in accordance with embodiments of the present invention.

In an aspect of the illustrated embodiment, this processing varies depending on whether a direct deposit transaction corresponds to the tax preparer's portion of the refund (i.e., the fee owing to the preparer 110) or the taxpayer's portion, although in some embodiments, both types of direct deposit transactions might be processed in the same way. In either case, in accordance with some embodiments, an account will be created to temporarily hold the funds from the direct deposit transaction (block 235). (In other embodiments, however, this will not be necessary, either because an account corresponding to the account identifier associated with the transaction is preexisting or because it is not necessary to create an account to process the transaction—for example, if a pseudoaccount is used.)

Hence, in an embodiment, if a direct deposit transaction is directed toward an account identifier that indicates that the transaction relates to a taxpayer's portion of a refund, the portion of the method indicated by blocks 240-275 will be used. Conversely, if the account identifier indicates that the direct deposit transaction corresponds to a tax preparer's fee, the portion of the method indicated by blocks 280-295 might be used. (Once again, however, it should be noted that, in various embodiments, the same procedures might be used to process both types of transactions.) In many implementations, both portions of the method will be used, since there will be two direct deposit transactions: one for the taxpayer's portion of the refund, and another for the tax preparer's fee.

At block 240, the financial institution's host computer performs a transaction to transfer funds to the money transfer services' host computer. In an aspect, this transaction might be a host-to-host transaction (e.g., a Western Union® Quick Cash® transaction). This transaction (which will be described as a host-to-host transaction for exemplary purposes, although other types of transactions are possible as well) effectively transfers an amount of money corresponding to the taxpayer's portion of the refund (e.g., the amount of the taxpayer's portion, optionally after subtracting any funds retained by the financial institution 125 as a fee for the service) from the financial institution 125 to the money transfer service 130. There generally will be a set of data associated with this transaction. This set of data might include, inter alia, the taxpayer's name (which might be derived as described above), the location identifier, a birthdate identifier, and/or the taxpayer identifier. Some or all of this data might be incorporated within a recipient identifier, which might comprise sufficient information to allow the taxpayer to be identified and/or to verify the identity of the taxpayer (as described elsewhere herein, for example). Moreover, in some embodiments, some or all of this data can be derived from the account identifier provided with the taxpayer's tax return and/or the taxpayer's name, in which the direct deposit was made by the treasury 120 (which information also might be sufficient to identify the taxpayer and/or verify the taxpayer's identity). Hence, in an aspect, the financial institution 125 simply passes on information received from the treasury 120 without having to obtain any additional information to process the direct deposit.

At this point, if a temporary account associated with the account identifier had been created, that account might be deleted automatically (block 245). Of course, if no temporary account had been created, or for any other suitable reason, this step might be omitted.

Upon receiving the host-to-host transaction (or any other suitable type of funds transfer transaction), the money transfer service's host computer identifies the host-to-host transaction as a money transfer transaction, with the taxpayer as recipient (block 250). At this point, if desired, the money transfer service 130 might notify the taxpayer 105 that a money transfer has been received. Merely by way of example, in accordance with some embodiments, the taxpayer can enroll (perhaps online, at an agent location, by phone, etc.) using the account identifier (which they might have received from the tax preparer, etc.) to be informed when a money transfer associated with that account identifier is received. When the money transfer transaction is received from the financial institution 125, the money transfer service 130 then can inform the taxpayer 105 (e.g., in the manner selected by the taxpayer 105, such as by email, telephone, etc.) that the money transfer is ready to be received by the taxpayer 105 (using any of the techniques described below, for example).

In any event, at some point, the taxpayer 105 will contact the money transfer service 130 to request the funds from the host-to-host transaction (i.e., the funds from the refund). This request can take a variety of forms. Merely by way of example, in many cases, the taxpayer 105 will visit an agent location of the money transfer service 130 to pick up the funds. Alternatively and/or additionally, facilities might be provided to allow the funds to be requested; merely by way of example, online, by phone, ATM, text messages, via financial power of attorney and/or preauthorization, as well as a number of vehicles to provide the requested funds (e.g., as a money transfer to another person or entity, as a transfer to another account, in the form of a money order and/or stored value card—such as prepaid cards, gift cards, and/or the like—to be mailed to the taxpayer 105, etc.). Also, the taxpayer may be able to contact the money transfer service 130 through a service, such as an interactive voice response system, to determine the status of the transaction. For example, a status may include "money received and ready for transactions" or "pending IRS transmission."

Upon receiving the request (block 255), the money transfer service 130 can verify the identity of the recipient as the taxpayer (block 260). This verification can take many forms. Merely by way of example, picture identification (or some other indicia of identity) may be required from the recipient (because the taxpayer's name is provided with the host-to-host transaction, in accordance with some embodiments, this taxpayer name can be used as the template to which any indicia of identity is compared). Further, since, in many embodiments, the taxpayer identifier is provided as a portion of the recipient identifier accompanying the host-to-host transaction, the portion of the taxpayer's phone number, TIN, etc. that was used to generate the taxpayer identifier can be the basis of a challenge question to provide additional security. (If an algorithm was used to derive the taxpayer identifier from the portion of the taxpayer's phone number, TIN, etc., that algorithm generally can be used in reverse by the money transfer service provider 130—or, more specifically, the money service provider's host computer—to obtain the original portion of the phone number, TIN, etc. for the challenge question.) Hence, in an embodiment, the taxpayer identifier can be used to validate the identity of the taxpayer (or, more specifically, to identify the identity of the recipient as that of the taxpayer).

Optionally (e.g., for additional security), the money service provider can verify that the recipient of the funds is within a designated payout area (e.g., as an additional security control.) This may involve the recipient being required to provide their location to a customer service representative. Merely by way of example, if the account identifier (and hence the recipient identifier) included a location identifier (such as a zip code, etc.) for the taxpayer, a payout area for the money transfer transaction can be determined (block 265). Alternative, the zip code may be requested from the recipient separately from during the creation of the account number. For instance, a birthdate may be used in the account number in place of the location identifier, the recipient's zip code (or other location identifier) may still be requested, but not incorporated into the account number. Merely by way of example, the state in which the zip code is located might be determined as the payout area for the money transfer transaction. Other payout areas might be relatively larger or smaller. Merely by way of example, in some cases, the state in which the zip code is located, along with each bordering state, might be determined as the payout area, while in other cases, the payout area might be limited to the zip code of the account identifier, perhaps along with surrounding zip codes. Many variations are possible.

After the payout area has been determined, the location of the recipient at the time of payout (e.g., the agent location at which the recipient requests the funds, the mailing address to which the recipient request the funds to be mailed, etc.) can be correlated against the determined payout area to verify that the payout location is indeed within the payout area (block 270), providing an additional layer of security.

At block 275, the funds are provided to the recipient (whose identity has been verified as that of the taxpayer). Any of several known procedures for providing funds from a money transfer can be used to provide the funds to the taxpayer, including without limitation those mentioned above. In some cases, a fee for the use of the money transfer refund service might be deducted from the amount of the refund before the funds are provided to the taxpayer.

In some embodiments, if the account code indicates that a direct deposit transaction corresponds to a tax preparer's fee, a different procedure might be followed. Merely by way of example, the tax preparer 110 might be identified (block 280), based, for example, on the portion of the account identifier that corresponds to the preparer identifier, by looking up, in a table, the preparer's record generated during the enrollment transaction. Once the preparer 110 has been identified, the routing number for the preparer's bank 135 can be identified, along with the preparer's account number at that bank (block 290), which collectively can be considered the preparer's direct deposit information. These values can be identified by a lookup in the same table. Once this information has been identified, a funds transfer (such as an ACH transaction, wire transfer, etc.) can be performed (block 290) to transfer the funds (again, perhaps after subtracting any applicable service fee) to the preparer's account. If appropriate, any temporary account created in relation to the account identifier can be deleted automatically at this point (block 295).

FIG. 3 provides a schematic illustration of one embodiment of a computer system 300 that can perform the methods of the invention and/or the functions of host computer, a tax preparer's computer and/or a taxpayer's computer, as described herein. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner. The computer system 300 is shown comprising hardware elements that can be electrically coupled via a bus 305 (or may otherwise be in communication, as appropriate). The hardware elements can include one or more processors 310, including without limitation one or more general-purpose processors and/or one or more special-purpose processors (such as digital signal processing chips, graphics acceleration chips, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 3 might also include a communications subsystem 330;

which can include without limitation a modem, a network card (wireless or wired), an infra-red communication device, and/or the like, a wireless communication device and/or chipset (such as a Bluetooth™ device, an 802.11 device, a WiFi device, a WiMax device, cellular communication facilities, etc.). The communications system 330 may permit data to be exchanged with a network (such as the network 410 described below, and/or any other devices described herein). In many embodiments, the computer system 300 will further comprise a memory 335, which can include a RAM or ROM device, as described above.

The computer system 300 also can comprise software elements, shown as being currently located within the working memory 335, including an operating system 340 and/or other code 345, such as one or more application programs, which may comprise computer programs of the invention and/or may be designed to implement methods of the invention, as described herein. Merely by way of example, one or more procedures described with respect to the method(s) discussed above might be implemented as instructions executable by a computer (and/or a processor within a computer). A set of these instructions might be stored on a computer-readable storage medium, such as the storage device(s) 325 described above. In some cases, the storage medium might be incorporated within a computer system, such that the instructions, when executed by the computer system, perform the procedures of the method(s). In other embodiments, the storage medium might be separate from a computer system (i.e., a removable medium, such as a compact disc, etc.), such that the storage medium can be used to program a generic computer with the instructions stored thereon.

It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

A set of embodiments comprises systems for processing tax refunds, including, inter alia, providing tax refunds as money transfers. Merely by way of example, FIG. 4 illustrates a schematic diagram of a system 400 that can be used in accordance with one set of embodiments. The system 400 can include one or more user computers 405, which can serve as a taxpayer's computer, a tax preparer's computer, etc., as well as an interface to various server computers and/or host computers described herein. The user computers 405 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 405 can also have any of a variety of applications, including one or more applications configured to perform methods of the invention, such as tax preparation applications, web browser applications and/or the like. Alternatively, the user computers 405 can be any other electronic device, such as a thin-client computer, Internet-enabled mobile telephone, and/or personal digital assistant, capable of communicating via a network (e.g., the network 410 described below) and/or displaying and navigating web pages or other types of electronic documents. Although the exemplary system 400 is shown with three user computers, any number of user computers can be supported.

Certain embodiments of the invention operate in a networked environment, which can include a network 410. The network 410 can be any type of network familiar to those skilled in the art that can support data communications using any of a variety of commercially-available protocols, including without limitation TCP/IP, SNA, IPX, AppleTalk, and the like. Merely by way of example, the network 410 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more host computers 415. Each of the server computers 415 may be configured with an operating system including without limitation any of those discussed above, as well as any commercially-available server operating systems, minicomputer operating systems and/or mainframe operating systems. Each of the servers 415 may also be running one or more applications, which can be configured to provide services in furtherance of embodiments of the invention, including without limitation performance of methods of the invention (and/or various operations thereof), as well as traditional transaction processing and/or banking operations.

Merely by way of example, one of the host computers 415 may incorporate, and/or may be in communication with a web server, which can be used, merely by way of example, to process requests for web pages or other electronic documents from user computers 405.

In certain embodiments, the system can include one or more databases 420. The location of the database(s) 420 is discretionary: merely by way of example, a database 420a might reside on a storage medium local to (and/or resident in) a host computer 415a. Alternatively and/or additionally, a database 420b can be remote from any or all of the computers 405, 415, so long as it can be in communication (e.g., via the network 410) with one or more of these. In a particular set of embodiments, a database 420 can reside in a storage-area network ("SAN") familiar to those skilled in the art. In a set of embodiments, a database 420 can be used to store information about transactions processed by the host computers 415, and in particular can comprise one or more tables used to store data in accordance with embodiments of the invention.

While the invention has been described with respect to exemplary embodiments, one skilled in the art will recognize, based on the disclosure herein, that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. In a relationship between a tax preparer, a financial institution, a money transfer service, and a taxpayer, a method of providing a tax refund to the taxpayer, the method comprising:
   creating a first account identifier comprising:
   a) a first money transfer service identifier comprising a set of one or more characters that identifies an account at the financial institution as corresponding to the money transfer service;
   b) a preparer identifier comprising a second set of characters that identifies the tax return preparer;
   c) a birthdate identifier comprising a third set of characters corresponding to the birthdate of the taxpayer; and
   d) a taxpayer identifier comprising a fourth set of characters that is derived from either a federal taxpayer identification number for the taxpayer or a telephone number corresponding to the taxpayer;
   creating a second account identifier comprising:
   a) a second money transfer service identifier comprising a set of one or more characters that identifies an account at the financial institution as corresponding to the money transfer service;
   b) the preparer identifier; and
   c) the taxpayer identifier;
   providing a routing number for the financial institution, along with the first account identifier, to a first governmental entity, as a direct deposit target for a first portion of the tax refund corresponding to the tax return;
   providing the routing number for the financial institution, along with the second account identifier, to the first governmental entity, as a direct deposit target for a second portion of the tax refund corresponding to the tax return, the second portion of the tax refund corresponding to a fee for the tax preparer;
   receiving, at a first host computer operated by the financial institution, a first direct deposit transaction from a second governmental entity, the first direct deposit having associated therewith a name of the taxpayer and being directed to a first account identified by the first account identifier;
   receiving, at the first host computer, a second direct deposit transaction from the second governmental entity, the second direct deposit transaction being directed to a second account identified by the second account identifier;
   performing a host-to-host transaction between the first host computer and a second host computer operated by the money service provider, wherein the host-to-host transaction transfers an amount of money corresponding to at least a portion of the first direct deposit transaction, and wherein the host-to-host transaction has associated therewith a set of data, the set of data comprising the name of the taxpayer, the birthdate identifier, and the taxpayer identifier; and
   providing, to the taxpayer, an amount of money corresponding to at least a portion of the amount of the host-to-host transaction.

2. A method as recited by claim 1, wherein the first governmental entity is the Internal Revenue Service and wherein the second governmental entity is the United States Treasury.

3. A method as recited by claim 1, wherein the first and second governmental entities are state governmental entities.

4. A method as recited by claim 1, further comprising:
   creating, at the first host computer, the first account; and
   creating, at the first host computer, the second account.

5. A method as recited by claim 4, wherein the first account is created only after receiving the first direct deposit transaction and the second account is created only after receiving the second direct deposit transaction.

6. A method as recited by claim 4, wherein the first account is deleted automatically after the host-to-host transaction is completed and wherein the second account is deleted automatically after the funds transfer is completed.

7. In a relationship between a financial institution, a money transfer service, and a taxpayer, a method of providing a tax refund to the taxpayer in relation to a tax return, the method comprising:
   creating a first account identifier comprising:
   a) a first money transfer service identifier comprising a set of one or more characters that identifies an account at the financial institution as corresponding to the money transfer service; and
   b) a taxpayer identifier comprising a second set of characters that is derived from either a federal taxpayer identification number for the taxpayer or a telephone number corresponding to the taxpayer;
   c) a birthdate identifier comprising a third set of characters corresponding to the birthdate of the taxpayer;
   providing a routing number for the financial institution, along with the first account identifier, to a governmental entity, as a direct deposit target for a first portion of the tax refund corresponding to the tax return;
   receiving, at a first host computer operated by the financial institution, a direct deposit transaction, the direct deposit having associated therewith a name of the taxpayer and being directed to a first account identified by the first account identifier;
   performing a host-to-host transaction between the first host computer and a second host computer operated by the money service provider, wherein the host-to-host transaction transfers an amount of money corresponding to at least a portion of a first direct deposit transaction, and wherein the host-to-host transaction has associated therewith a set of data, the set of data comprising the name of the tax payer and the taxpayer identifier;
   at the second host computer, identifying the host-to-host transaction as a money transfer transaction having the taxpayer as a recipient;
   receiving a request from the taxpayer to obtain funds from the money transfer transaction;
   verifying, based at least in part on the taxpayer identifier, an identity of the taxpayer; and
   providing, to the taxpayer, an amount of money corresponding to at least a portion of the amount of the host-to-host transaction.

8. In a relationship between a financial institution, a money transfer service, and a taxpayer, a method of providing a tax refund to the taxpayer in relation to a tax return, the method comprising:

receiving, at a first host computer operated by the financial institution, a direct deposit transaction in a first amount from a governmental entity, the direct deposit transaction corresponding to a refund related to a tax return filed on behalf of the taxpayer, wherein the direct deposit transaction has associated therewith an account identifier, the account identifier comprising a first portion having sufficient information to identify the direct deposit as being related to the money transfer service and a second portion having sufficient information to enable the money transfer service to identify the taxpayer wherein the second portion of the account identifier comprises birthdate information of the taxpayer;

identifying the direct deposit transaction as being related to the money transfer service, based at least in part on the first portion of the account identifier; and performing a money transfer transaction, from the first host computer to a second host computer operated by the money transfer service, wherein the money transfer transaction has a second amount and has a recipient identifier associated with the money transfer transaction, the recipient identifier being derived at least in part from the second portion of the account identifier and comprising sufficient information to enable the money transfer service to identify the taxpayer as a recipient of the money transfer, and wherein the money transfer transaction results in the transfer of funds from an account at the first host computer to an account at the second host computer.

9. A method as recited by claim 8, wherein the second portion of the account identifier comprises sufficient information to verify an identity of the taxpayer.

10. A method as recited by claim 8, wherein the recipient identifier comprises the second portion of the account identifier.

11. A method as recited by claim 8, wherein the recipient identifier comprises a taxpayer name derived from information associated with the direct deposit transaction.

12. A method as recited by claim 8, wherein the second portion of the account identifier comprises at least a portion of a taxpayer identification number for the taxpayer.

13. A method as recited by claim 8, wherein the first portion of the account number is a money transfer service identifier comprising a set of one or more characters that identifies an account at the financial institution as corresponding to the money transfer service, wherein the second portion of the account number is a taxpayer identifier comprising a set of characters that is derived from either a federal taxpayer identification number for the taxpayer or a telephone number corresponding to the taxpayer, and wherein the account number further comprises:

a birthdate identifier comprising a set of characters corresponding to the birthdate of the taxpayer.

14. A method as recited by claim 8, wherein the second amount is derived by subtracting a service fee from the first amount.

15. A method as recited by claim 8, wherein the first amount and the second amount are the same amount.

16. A method as recited by claim 8, wherein the money transfer transaction is a host-to-host transaction.

17. A method as recited by claim 16, further comprising:

receiving, at the second host computer, the host-to-host transaction;

identifying, at the second host computer, the host-to-host transaction as a money transfer transaction having the taxpayer as a recipient, based at least in part on the recipient identifier;

receiving a request from the taxpayer to receive the money transfer transaction;

verifying an identity of the taxpayer, based at least in part on the recipient identifier; and providing, to the taxpayer, an amount of money corresponding to at least a portion of the second amount.

18. A method as recited by claim 8, wherein the direct deposit transaction is a first direct deposit transaction and the account identifier is a first account identifier, the method further comprising:

receiving, at the first host computer, a second direct deposit transaction from the governmental entity, the second direct deposit transaction having associated therewith a second account identifier, the second account identifier comprising a first portion having sufficient information to identify the direct deposit as being related to the money transfer service and a second portion comprising a preparer identifier for a tax preparer that prepared the tax return;

identifying the tax preparer, based at least in part on the second portion of the second account number;

identifying a routing number for a second financial institution, based at least in part on an identification of the tax preparer;

identifying a tax preparer account number for the tax preparer at the second financial institution, based at least in part on the identification of the tax preparer;

performing a funds transfer to an account associated with the tax preparer account number at the second financial institution, wherein the funds transfer has an amount derived from an amount of the second direct deposit.

19. A method as recited by claim 18, further comprising:

processing an enrollment transaction for the tax preparer, wherein the enrollment transaction comprises the preparer identifier and a set of preparer direct deposit information comprising the routing number and the tax preparer account number; and correlating, in a table, the preparer identifier with the set of preparer direct deposit information;

wherein identifying the tax preparer comprises looking up the preparer identifier in the table, and wherein routing number and the tax preparer account number are identified from the table.

20. A method as recited by claim 18, wherein the amount of the funds transfer is derived by subtracting a service fee from the amount of the second direct deposit.

21. A method as recited by claim 18, wherein the amount of the funds transfer is the amount of the second direct deposit.

22. A method as recited by claim 18, wherein the amount of the funds transfer corresponds to a fee charged by the tax preparer for the preparation of the tax return.

23. In a relationship between a financial institution, a money transfer service, and a taxpayer, a computer system for of providing a tax refund to the taxpayer in relation to a tax return, the system comprising:

one or more processors; and a computer readable medium, in communication with the one or more processors, the computer readable medium having embodied thereon a set of instructions executable by the one or more processors, the set of instructions comprising:

instructions to receive, at the computer system, a direct deposit transaction in a first amount from a governmental entity, the direct deposit transaction corresponding to refund related to a tax return filed on behalf of the taxpayer, wherein the direct deposit transaction has associated therewith an account identifier, the account identifier comprising sufficient information to enable the money transfer service to identify the taxpayer, wherein the sufficient information comprises a birthdate; and instructions to perform a host-to-host transaction, from the computer system to a host computer operated by the money transfer service, wherein the host-to-host transaction has a second amount and has a recipient identifier associated with the host-to-host transaction, the recipient identifier being derived from the portion of the account identifier and comprising sufficient information to enable the financial service provider to identify the taxpayer as a recipient of the money transfer and to verify an identity of the taxpayer, and wherein the host-to-host transaction results in the transfer of funds from an account at the first host computer to an account at the second host computer.

* * * * *